(12) United States Patent
Peet

(10) Patent No.: US 11,333,330 B2
(45) Date of Patent: May 17, 2022

(54) AUTOMATIC SHEET METAL INTEGRATED FROG FIXATION

(71) Applicant: SIGNIFY HOLDING B.V., Eindhoven (NL)

(72) Inventor: Jimmy Peet, Helmond (NL)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 17/417,867

(22) PCT Filed: Dec. 20, 2019

(86) PCT No.: PCT/EP2019/086720
§ 371 (c)(1),
(2) Date: Jun. 24, 2021

(87) PCT Pub. No.: WO2020/141115
PCT Pub. Date: Jul. 9, 2020

(65) Prior Publication Data
US 2022/0099277 A1    Mar. 31, 2022

(30) Foreign Application Priority Data
Jan. 3, 2019 (EP) .................................. 19150195

(51) Int. Cl.
*F21V 19/00* (2006.01)
*F21S 4/28* (2016.01)
*F21V 21/088* (2006.01)

(52) U.S. Cl.
CPC .............. *F21V 19/004* (2013.01); *F21S 4/28* (2016.01); *F21V 21/088* (2013.01)

(58) Field of Classification Search
CPC ...... F21V 19/003; F21V 19/004; F21V 21/08; F21V 21/088; F21S 4/20; F21S 4/28;
(Continued)

(56) References Cited

U.S. PATENT DOCUMENTS

2017/0059139 A1* 3/2017 McCanless ........... F21V 19/004
                                                        362/382
2019/0293269 A1* 9/2019 Roys ..................... F21V 21/088
                                                        362/396

* cited by examiner

*Primary Examiner* — Y M. Quach Lee
(74) *Attorney, Agent, or Firm* — Daniel J. Piotrowski

(57) ABSTRACT

The invention provides a metal-based support (100) for a lighting element (200), wherein the lighting element (200) comprises a light source support (300) and a light source (10) functionally coupled to the light source support (300), wherein the metal-based support (100) comprises a metal body (140) and a fixation element (400) for fixating the light source support (300) to the metal-based support (100), wherein at least part of the fixation element (400) is part of the metal body (140), wherein the fixation element (400) comprises a central part (410) which is configurable in a first configuration and in a second configuration, different from the first configuration, wherein a change from one configuration to the other can be effected by applying a force on the central part (410), wherein the fixation element (400) comprises two protruding elements (420) configured extending from the central part (410) in both configurations of the central part (410), wherein terminal parts (421) of the respective protruding elements (420) have a first mutual distance (d1) in the first configuration of the central part (410) and a second mutual distance (d2) in the second configuration of the central part (410), wherein the first mutual distance (d1) is larger than the second mutual distance (d2), and wherein the fixation element (400) is configured to receive the light source support (300) in the first configuration and to fixate the light source support (300) to the metal-based support (100) in the second configuration.

15 Claims, 4 Drawing Sheets

(58) Field of Classification Search
CPC ...... F16B 5/0635; F16B 5/0664; F16B 5/121; F16B 5/126
See application file for complete search history.

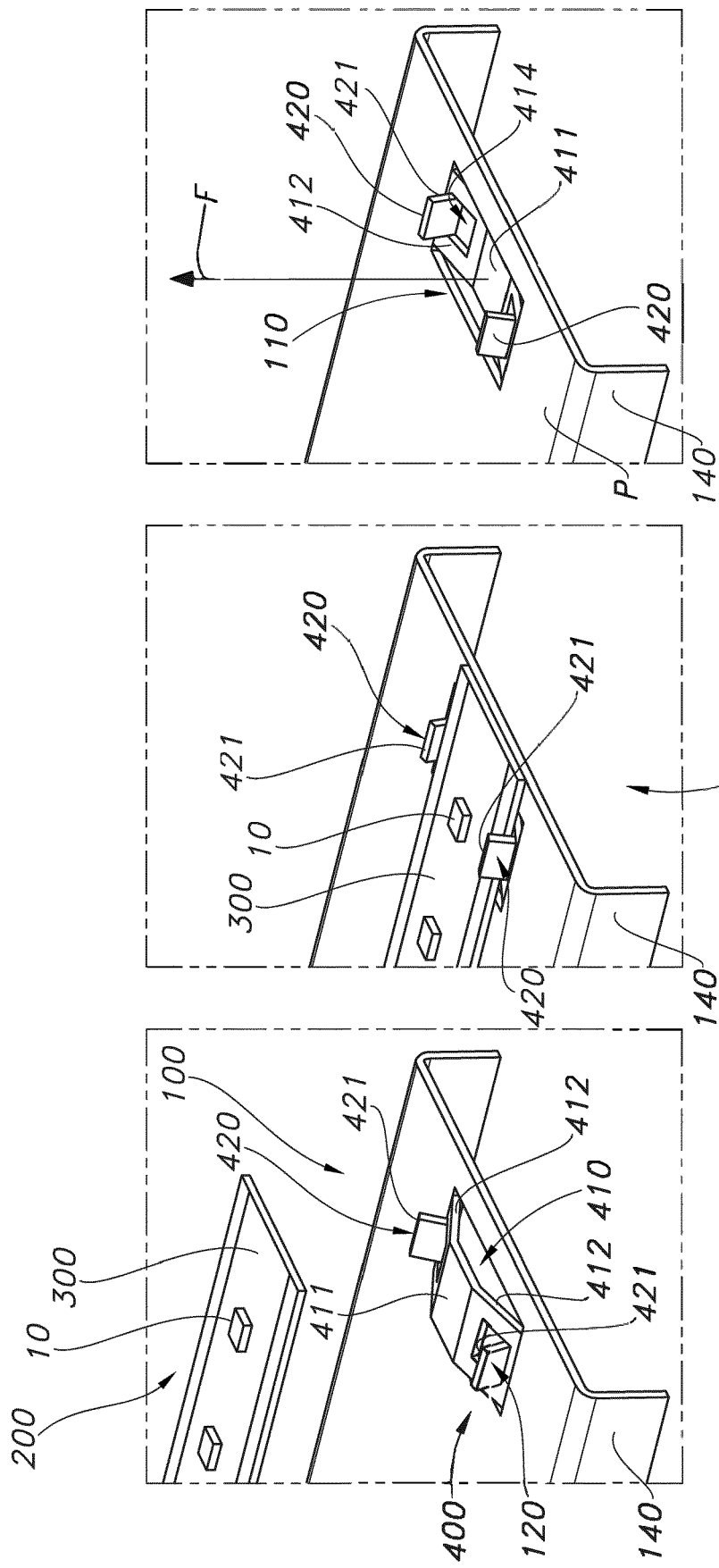

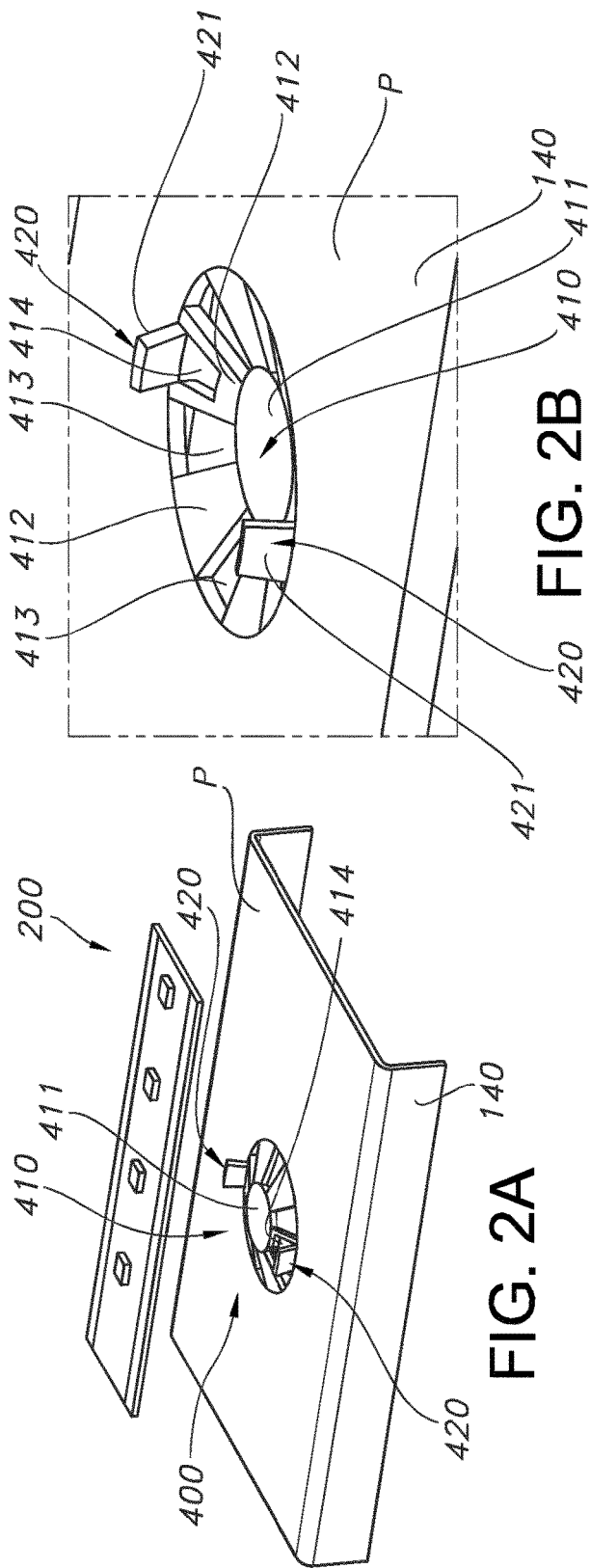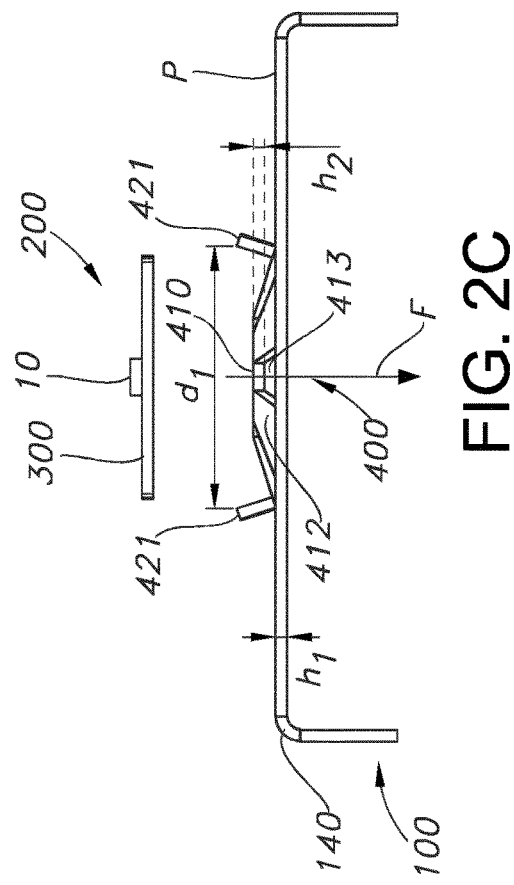

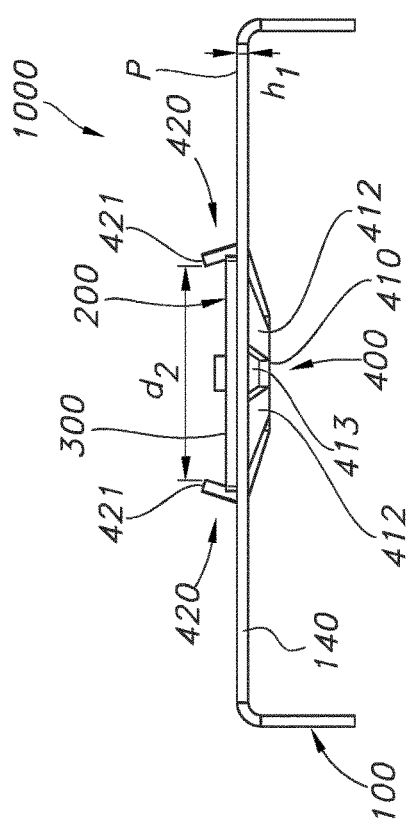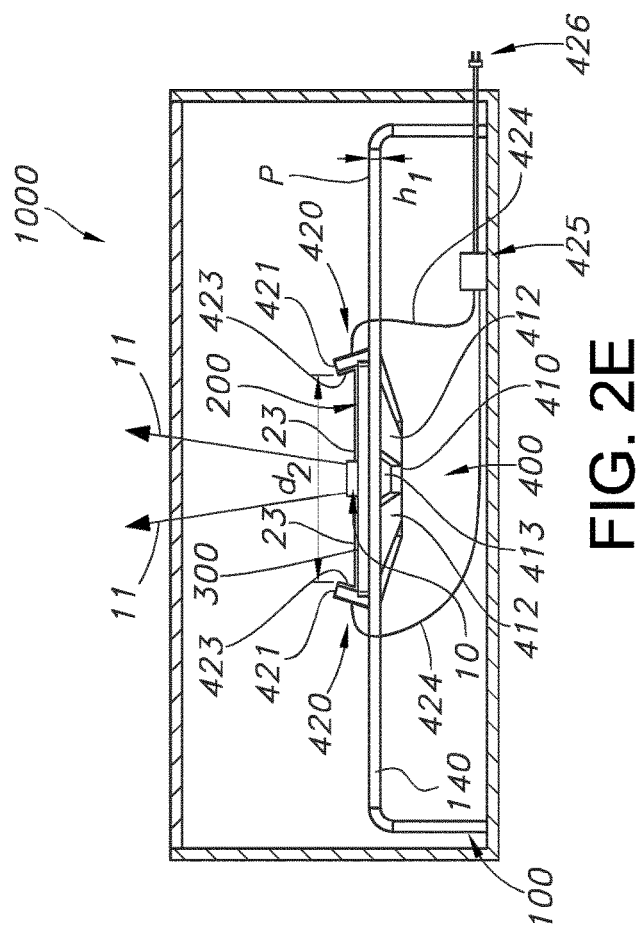

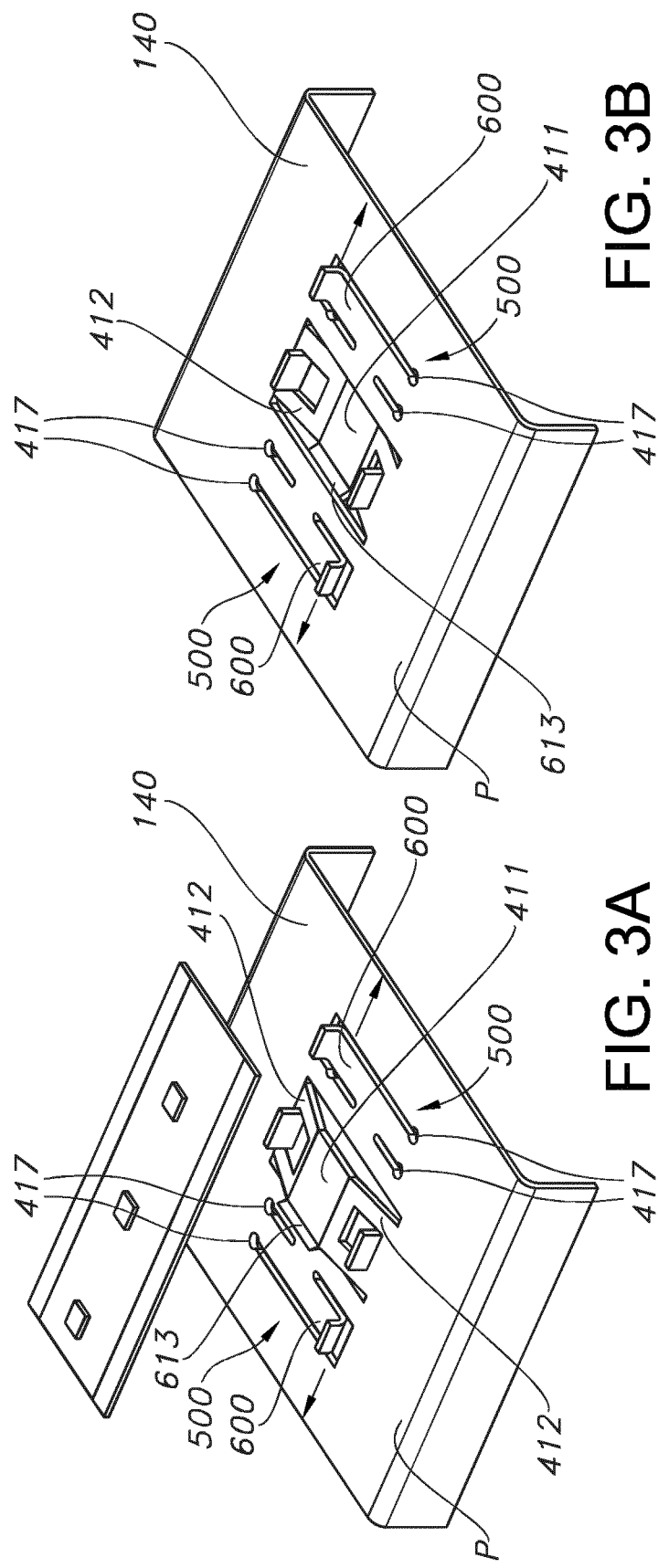

AUTOMATIC SHEET METAL INTEGRATED FROG FIXATION

CROSS-REFERENCE TO PRIOR APPLICATIONS

This application is the U.S. National Phase application under 35 U.S.C. § 371 of International Application No. PCT/EP2019/086720, filed on Dec. 20, 2019, which claims the benefit of European Patent Application No. 19150195.6, filed on Jan. 3, 2019. These applications are hereby incorporated by reference herein.

FIELD OF THE INVENTION

The invention relates to a support for supporting a light source element, such as a PCB (printed circuit board). The invention also relates to a lighting device comprising such support. Yet further, the invention also relates to a kit of parts comprising the light source element as well as the support for supporting the light source element.

BACKGROUND OF THE INVENTION

Elements for holding e.g. LED packages are known in the art. US2013/0201701, for instance, describes a socket assembly includes a light emitting diode (LED) package having an LED printed circuit board (PCB) with an LED mounted thereto. The socket assembly also includes a clamp for holding the LED package to a support structure. The clamp includes a base that is configured to be mounted to the support structure such that the base engages the support structure. The clamp also includes a spring finger that extends from the base such that the base and the spring finger define a unitary body of the clamp. The spring finger is configured to engage the LED PCB of the LED package and apply a clamping force to the LED PCB that acts in a direction toward the support structure.

EP 2 886 945 A1 discloses a luminaire with a printed circuit board which has at least one LED source, a light strip which can be mounted on a base profile and an optic covering the at least one LED source in one emission direction, the light strip has a support section with a mounting surface to which the circuit board and the optic are fastened, characterized in that the luminaire comprises a one-piece mounting element, the printed circuit board and the optics on the mounting surface of the support portion of the light strip fixed. The luminaire according to the invention makes it possible for the printed circuit board and the optic to be fastened in one part to the light strip during their production. In addition, the mounting element of the luminaire allows comparatively few and comparatively simple components to be used in this production step. In this way, a relatively fast, efficient and yet sufficiently safe production of the lamp is possible

SUMMARY OF THE INVENTION

Presently, in most cases rigid PCB's with LEDs and are mounted in luminaires by means of screws. This mounting is performed in the luminaire factory and requires skilled and trained personal. Next to that the installation requires a fixation of the module to the luminaire by means of screws or tape. This fixation by screws or tape may cost a lot of time and need extra skills, tools and boundaries to get this done in the right way with a constant performance. Also extra components like screws or tape are needed here. The time needed and the extra components are increasing the costs to fixate the light module. The current fixation of the light module has the problem of high costs for fixation, containing: high assembly cost because of much time needed to assemble a screw (slow fixation), extra component costs (screws, washers or tape), extra tooling costs to fixate (extra hands, tool for screws or tools to clean surface for tape fixation). Also extra boundaries are needed to align the module to the luminaire. In total a high risk of wrong fixation in the current way (not easy to use). Further, the present concept complicates re-opening of the fixation.

Hence, it is an aspect of the invention to provide an alternative support for supporting a light source element, which preferably further at least partly obviates one or more of above-described drawbacks. The present invention may have as object to overcome or ameliorate at least one of the disadvantages of the prior art, or to provide a useful alternative.

In a first aspect, the invention provides a (metal-based) support ("host support") for supporting an element comprising a support ("guest support") (such as in embodiments a lighting element, wherein the lighting element comprises a light source support and a light source functionally coupled to the light source support), wherein the (metal-based) support comprises a (metal) body ("body") and a fixation element for fixating the element, such as light source support to the (metal-based) support, wherein at least part of the fixation element is part of the (metal) body, wherein the fixation element comprises a central part which is configurable in a first configuration and in a second configuration, different from the first configuration, wherein a change from one configuration to the other can be effected by applying a force on the central part, wherein the fixation element comprises two protruding elements configured extending from the central part in both configurations of the central part, wherein terminal parts of the respective protruding elements have a first mutual distance (d1) in the first configuration of the central part and a second mutual distance (d2) in the second configuration of the central part, wherein the first mutual distance (d1) is larger than the second mutual distance (d2), and wherein the fixation element is configured to receive the support, such as the light source support, in the first configuration and to fixate the support, such as the light source support, to the metal-based support in the second configuration. The (host) support may be made from materials other than a metal. The (host) support may be metal-based and/or polymer based. The polymer may be a plastic material, preferably a hard plastic material. The body may comprise a metal and/or a polymer. The body may comprise other materials than metal. The polymer may be a plastic material, preferably a hard plastic material.

Such (host) support may allow an easy fixation of another body, such as the guest support, like a support for a light source. The guest support can easily be fixated to the host support. When the fixation element is available or brought into the first configuration, the guest support can pressed in the fixation element, which snaps or jumps by the pressure into the second configuration, in which the guest support is fixated by the protruding elements. Hence, the fixation element may also be called a "frog fixation element" or "frog fixation". Further, with such fixation element, a pressure applied thereto in the opposite direction may also again release the guest support. Hence, the fixation element allows a quick fixation, and where necessary also a release, e.g. for repair or exchange of the guest support (with one or more electronic components).

The (metal-based) support ("host support") may be bi-stable i.e. has two stable states i.e. can rest in two states.

Especially, when the central part is in the first configuration the light source support may be pressed in the fixation element by applying a force in a first direction, so that the central part snaps or jumps into the second configuration, and wherein when the central part is in the second configuration the light source support may be released from the fixation element by applying a force in a second direction, wherein first direction and the second direction are perpendicular to the plane P, the second direction being opposite to the first direction.

The guest support may include a functional element, especially an electronic component, functionally coupled to the guest support. The electronic component may include an active or a passive electronic component. An active electronic component may be any type of circuit component with the ability to electrically control electron flow (electricity controlling electricity). Examples thereof are diodes, especially light emitting diodes (LED). LEDs are herein also indicated with the more general term solid state lighting devices or solid state light sources. Hence, in embodiments the electronic component comprises an active electronic component. Especially, the electronic component comprises a solid state light source. Other examples of active electronic components may include power sources, such as a battery, a piezo-electric device, an integrated circuit (IC), and a transistor. In yet other embodiments, the electronic component may include a passive electronic component. Components incapable of controlling current by means of another electrical signal are called passive devices. Resistors, capacitors, inductors, transformers, etc. can be considered passive devices. In an embodiment, the electronic component may include an RFID (Radio-frequency identification) chip. A RFID chip may be passive or active.

Especially, the electronic component may include one or more of a solid state light source (such as a LED), a RFID chip, and an IC. The term "electronic component" may also refer to a plurality of alike or a plurality of different electronic components. The support may especially comprise a PCB.

In embodiments, the electronic component comprises a light source, such as a solid state light source. Especially, the support comprises (thus) a light source support, with a light source functionally coupled thereto. Here below, the invention is especially explained in relation to a light source support (and light source functionally coupled thereto).

As indicated above, the support or host support, especially comprises a metal-based support. The metal-based support comprises a metal body and a fixation element for fixating the light source support to the metal-based support. An advantage of metal is that structures may be created therein and/or thereto by applying pressure and/or by punching. The metal-based support may also comprise one or more (electrically) insulating layers. For instance, the metal-based support may comprise a stack including the metal body and one or more (electrically) insulating layers (thereon). Further, the support may in embodiments comprise electrically conductive tracks or isolated electrically conductors, such isolated electrical wiring.

The term "fixation element" may also refer to a plurality of (different) fixation elements. Hence, the (metal-based) support may comprise a plurality of (different) fixation elements. They may all be configured to fixate the same guest support, or two or more may be configured to fixate the same guest support, or subsets of one or more fixation elements may be configured to fixate different guest supports. Hence, in embodiments the (metal-based) support may comprise a (linear) array of (a plurality) of (different) fixation elements.

Hence, especially the metal-based support, more especially the metal body, comprises a metal plate or a metal sheet. The fixation element is obtainable by one or more of punching, stretching and pressing one or more parts of the metal body. Such methods are known in the art. Punching may include generating through holes or through slits in the metal body. Pressing may include deforming a part of the metal body. Stretching may include deforming part of the metal body by which the thickness of at least part the part that is deformed is reduced. Stretching may also lead to a local change of the material properties. Other methods known in the art to manipulate metal may also be used. Hence, the invention provides in embodiments an automatic sheet metal integrated frog fixation, as during production of the metal-body, the fixation element may be introduced (in a relative simple way with known technologies).

Therefore, in embodiments at least part of the fixation element is part of the metal body. The metal body and the fixation element may be a monolithic element (or monolithic body).

The fixation element comprises a central part which is configurable in a first configuration and in a second configuration, different from the first configuration, wherein a change from one configuration to the other can be effected by applying a force on the central part. Hence, the change from configuration of the central part especially provides the locking and unlocking of the fixation element. The central part may in embodiments have resilient properties. Upon deformation, the central part may jump to the other configuration, and back. Similar configurations are e.g. also known from hair clips (frogs) or snap hair clips. Hence, the herein presented fixation element may also be indicated as "snap fixation element". Therefore, terms like "a punching or clipping action" and similar terms may also refer to "snapping" or "snapping action", and similar descriptions. Instead of the phrase "configurations of the central part" and similar phrases, also the phrase "configurations of the fixation element" and similar phrases may be applied.

The fixation element comprises two protruding elements configured extending from the central part in both configurations of the central part. This implies that in both configuration, be it the first configuration or the second configuration, the protruding elements extend from the central part. However, their position or angle may be changed, as the central part has changed configuration. Due to the change in position, the protruding element may pinch or clip another element (the host support e.g.).

The phrase "two protruding elements" may also encompass embodiments wherein more than two protruding elements are available. Hence, in embodiments the fixation element may comprise a (linear) array of (a plurality) of (different) protruding elements. More especially, in embodiments the fixation element may comprise two (linear) arrays, each comprising a plurality of (different) protruding elements. In embodiments, the protruding elements of different arrays may especially be configured equi-distant (i.e. especially the arrays are configured parallel and the protruding elements may all essentially have the same shape). The length of the protruding elements may be in the order of 2-10 mm, though other dimensions may also be possible.

Especially, the protruding elements are configured with at least part of the central part configured between the protruding elements. In embodiments, the protruding elements may be part of the central part, i.e. the may be (directly)

physically coupled to the central part. As indicated below, in embodiments they may be punched from the central part. Especially, the protruding elements are configured at an edge or at edges of the central part, such that essentially the entire central part is configured between the protruding elements.

As indicated above, position or angle may be changed, as the central part has changed configuration. Hence, the mutual distance, such as the distance between terminal parts of the protruding elements may differ between the two configurations. This allows the receiving of an element, such as a guest support, in the first configuration, and a punching or clipping action in the second configuration. Therefore, the terminal parts of the respective protruding elements have a first mutual distance (d1) in the first configuration of the central part and a second mutual distance (d2) in the second configuration of the central part, wherein the first mutual distance (d1) is larger than the second mutual distance (d2). The difference between the mutual distances may be small, such as in the range of e.g. 0.2-10 mm, in general selected from the range of about 0.5-5 mm.

Hence, the (metal-based) support may be a support for e.g. a lighting element. The lighting element may in embodiments comprise a light source support and a light source functionally coupled to the light source support. Note however that the lighting element is not part of the (metal-based) (host) support, but may be fixated to the host support.

The fixation element of the host support may thus especially be configured to receive the light source support in the first configuration and to fixate the light source support to the metal-based support in the second configuration.

The snap fixation may e.g. be characterized by a first configuration and a second configuration which are convex and concave, respectively, or vice versa. Especially, in embodiments the first configuration is convex configuration, relative to the protruding elements, and the second configuration is concave, relative to protruding elements. This may provide a simple mechanism wherein the protruding elements, or there terminal parts, are moved to each other when going from the first to the second configuration.

Several general shapes of the fixation element may be possible, such as an essentially circular or an essentially rectangular general shape of the fixation.

In embodiments, the central part has a circular shape, wherein the central part comprises a central element associated to the metal body with at least two radially configured connector elements, and comprising radially configured openings between the connector elements.

Especially, in embodiments the protruding elements are punched parts of the connector elements. The radially configured openings may be the result of the complete removal of some material of the support, whereas the protruding elements may be the result of one or more cuts, whereas some part stays physically coupled to the metal body. This allows bending away of a metal part, whereby a protruding element may be formed.

Alternatively or additionally, the central part has a rectangular shape, wherein the central part comprises a central element associated to the metal body with at least two bridgingly configured connector elements, bridging the distance between the central element and the (remainder of the) metal body. The rectangular shape may be delimited by elongated slits, where cuts in the metal body have been provided.

In embodiments, the protruding elements are punched parts of the connector elements. As indicated above, the protruding elements may be the result of one or more cuts, whereas some part stays physically coupled to the metal body. This allows bending away of a metal part, whereby a protruding element may be formed.

For providing flexibility to the fixation element, or at least part thereof, the connector elements may have a thickness smaller than of the (remainder of the) metal body. Hence, in embodiments the metal body may have a first thickness (H1), wherein the connector elements have a second thickness (H2), wherein H2<H1. Especially, in embodiments the first thickness (H1) may be selected from the range of about 0.3-8 mm, such a 0.3-5 mm, especially in the range of 0.3-2 mm, such as in the range of 0.3-1 mm, like in the range of about 0.3-0.8 mm, and wherein the second thickness (H2) is selected from the range of 0.1-2 mm, such as selected from the range of about 0.1-1.5 mm, such as 0.1-1 mm, like in the range of about 0.2-0.6. As indicated, in embodiments H2<H1.

It may be desirable to lock the fixation in the second configuration, in order to prevent a de-fixation, e.g. by a shock, or by the weight of the guest element, such as in a suspended configuration. Hence, in embodiments the (metal-based) support may further comprise a locking system, configured to maintain in a locked configuration the central part in the second configuration and to allow in an unlocked configuration a change of the central part from the second configuration to the first configuration.

The locking system may be added to the host support, or may in embodiments be part of the host support. Therefore, in embodiments at least part of the locking system is part of the metal body.

In specific embodiments, the (metal) body may further comprises a second element, wherein the locking system comprises the second element, wherein the second element is (in embodiments) movable in a plane (P) of the metal body in a direction away from the fixation element when applying a force to the second element (in a direction away from the fixation element), wherein the second element is connected to the central part with a second bridging element, wherein the locking system is configured to maintain the central part in the second configuration in a locked configuration when no force is applied to the second element and to allow a change to the first configuration in an unlocked configuration when the force is applied to the second element.

In alternative embodiments, the second element, may be movable out of the plane (P). Especially, however the movement of the second element is such that not in one linear movement the second element may be unlocked and the central part be pressed. For this reason, the unlocking of the locked configuration may be done by a rotation and/or by a pressure in the plane of or parallel to the host support, whereas the pressure for changing from the second to the first configuration may be perpendicular to the plane of (or parallel) to the host support.

In embodiments, the metal body or the fixation element may include a kind of a barb, which may be configured such that a transition from the first configuration to the second configuration may be effected by applying pressure to e.g. the central part (see also above), whereas a transition from the second configuration to the first configuration may only be effected by applying pressure and unlocking the barb. For instance, by applying a force to the barb or by pulling back the barb, the central part may be pushed back such that the first configuration is obtained. The locking system may be used to unlock the barb. The term "barb" may also refer to a plurality of different barbs. In a specific embodiment, the barb is functionally coupled to the central part.

Therefore, in a specific embodiment the (metal-based) body may further comprise a second element, wherein the locking system comprises the second element, wherein the second element is movable in a plane (P) of the metal body in a direction away from the fixation element when applying a force to the second element, wherein the locking system is configured to maintain the central part in the second configuration in a locked configuration when no force is applied to the second element and to allow a change to the first configuration in an unlocked configuration when the force is applied to the second element, wherein the fixation element further comprises a locking element, extending from the central part, wherein the locking element is configured such that when the fixation element changes from the first configuration to the second configuration, the locking element moves along part of the metal body with friction, and in the second configuration the locking element prevents return in the first configuration, wherein when the second element is moved in a plane (P) of the metal body in a direction away from the fixation element when applying a force to the second element, the locking element can pass along the part of the metal body and allow the fixation element return in the first configuration. The locking element may have the function of a barb or similar function. Hence, the locking element, which may be coupled to the metal body or to the central part (though other options may also be possible), prevents a return to the first configuration by only applying pressure to the central part, but requires an additional action, such as pulling back the barb or pulling back part of the metal body. The metal body may have some flexible parts, such as provided in embodiments by the locking system.

In yet further embodiments, the protruding elements may be applied to generate an electrical coupling between the light source (or other electronic component) and a source of power (which may be external from a lighting device comprising the (metal-based) support. Hence, in embodiments the protruding elements comprise electrodes functionally coupled to electrically conductive elements, wherein the electrodes are configured to functionally couple to second electrically conductive element comprised by the lighting element and functionally coupled to the light source.

In yet a further aspect, the invention also provides a lighting device comprising the (metal-based) support as defined herein. Especially, such lighting device may also comprise the lighting element, wherein the lighting element comprises a light source support and a light source functionally coupled to the light source support. In embodiments, the lighting device may be a luminaire.

The lighting device may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, or LCD backlighting.

In yet a further aspect, the invention also provides a kit of parts comprising (i) the (metal-based) support and (ii) a lighting element, wherein the lighting element especially comprises a light source support and a light source functionally coupled to the light source support.

The term "kit of parts" especially refers to two or more items (parts) that may be distinct, but which are in the context of the invention designed to be used together. Especially, to two or more items (parts) may be designed to be arranged into a single arrangement, such as a device, apparatus or system. The term "kit of parts" may refer to the two or more items in a physical kit, but this is not necessarily the case. Together, the two or more items may provide a desired effect. The desired effect, herein, is especially the fixation of an element, such as a guest support, in another element, such as the host support.

The term "light source" may refer to a semiconductor light-emitting device, such as a light emitting diode (LEDs), a resonant cavity light emitting diode (RCLED), a vertical cavity laser diode (VCSELs), an edge emitting laser, etc. The term "light source" may also refer to an organic light-emitting diode, such as a passive-matrix (PMOLED) or an active-matrix (AMOLED). In a specific embodiment, the light source comprises a solid state light source (such as a LED or laser diode). In an embodiment, the light source comprises a LED (light emitting diode). The term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of semiconductor light sources may be configured on the same substrate. In embodiments, a COB is a multi LED chip configured together as a single lighting module. The term "light source" may also relate to a plurality of light sources, such as 2-2000 solid state light sources.

The light source may be configured to provide white light, though colored may in embodiments also be possible. Further, when a plurality of (different) light sources are available, it may also be possible to control one or more spectral properties like color point, correlated color temperature (CCT), and color rendering index (CRI). The term white light herein, is known to the person skilled in the art. It especially relates to light having a correlated color temperature (CCT) between about 2000 and 20000 K, especially 2700-20000 K, for general lighting especially in the range of about 2700 K and 6500 K, and for backlighting purposes especially in the range of about 7000 K and 20000 K, and especially within about 15 SDCM (standard deviation of color matching) from the BBL (black body locus), especially within about 10 SDCM from the BBL, even more especially within about 5 SDCM from the BBL.

In an embodiment, the light source may also provide light source light having a correlated color temperature (CCT) between about 5000 and 20000 K, e.g. direct phosphor converted LEDs (blue light emitting diode with thin layer of phosphor for e.g. obtaining of 10000 K). Hence, in a specific embodiment the light source is configured to provide light source light with a correlated color temperature in the range of 5000-20000 K, even more especially in the range of 6000-20000 K, such as 8000-20000 K. An advantage of the relative high color temperature may be that there may be a relative high blue component in the light source light.

Especially, the lighting element (as described herein) may comprise the light source support and a plurality of solid state light sources functionally coupled to the light source support. As indicated above, in embodiments the lighting element may comprise a plurality of different light sources. As also indicated above, in embodiments the light source support comprises a printed circuit board (PCB).

Some further specific embodiments are further elucidated below.

In embodiments, the (metal-based) support may be made from aluminum, copper, iron, steel, etc. Hence, the support may especially have a thermal conductivity of at least 100 W/mK, such as at least 200 W/mK, like especially at least 250 W/mK. The higher the thermal conductivity the better the thermal management the higher the lumen-output of the light source may be.

Nevertheless, the (metal-based) support may also comprise one or more an (electrically) insulating layers. An (electrically) insulating layer may provide safety (measures). Hence, in embodiments the (metal-based) support may comprise a stack of layers, of which one may be a metal layer.

The light source support may be especially rigid.

As indicated above, the protruding elements may comprise electrodes. In clamped position the electrodes may contact electrodes on the light source support (see also above). In this way the solid state light source, such as a LED, (or other electronic component) can be powered from the metal-based support.

The metal-based support may comprise multiple fixation elements ('clamps').

The system, or apparatus, or device may execute an action in a "mode" or "operation mode" or "mode of operation". Likewise, in a method an action or stage, or step may be executed in a "mode" or "operation mode" or "mode of operation". The term "mode" may also be indicated as "controlling mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

BRIEF DESCRIPTION OF THE DRAWINGS

Embodiments of the invention will now be described, by way of example only, with reference to the accompanying schematic drawings in which corresponding reference symbols indicate corresponding parts, and in which:

FIGS. 1a-1c schematically depict an embodiment of amongst others an embodiment of fixation element having essentially a rectangular shape;

FIGS. 2a-2b schematically depict an embodiment of amongst others an embodiment of a fixation element having essentially a circular shape;

FIGS. 2c-2e schematically depict some aspects of embodiment of a fixation element in a cross-sectional view, and other embodiments and aspects; and FIGS. 3a-3b schematically depict amongst others an embodiment of fixation element in combination with an embodiment of a locking system.

The schematic drawings are not necessarily to scale.

DETAILED DESCRIPTION OF THE EMBODIMENTS

FIGS. 1a-1b schematically depicts an embodiment of a support 100, especially a metal-based support 100 for a lighting element 200.

Effectively, FIG. 1a also schematically depicts a kit of parts comprising (i) the metal-based support 100 and (ii) the lighting element 200. Effectively, FIG. 1b also schematically depicts an embodiment of a lighting device 1000 comprising the metal-based support 100 and the lighting element 200.

As schematically depicted, the lighting element 200 comprises a light source support 300, such as a PCB, and a light source 10, such as a solid state light source, functionally coupled to the light source support 300. Here, by way of example the lighting element 200 comprises the light source support 300 and a plurality of solid state light sources 110 functionally coupled to the light source support 300.

The metal-based support 100 comprises a metal body 140 and a fixation element 400 for fixating the light source support 300 to the metal-based support 100. As schematically depicted, at least part of the fixation element 400 is part of the metal body 140.

The fixation element 400 comprises a central part 410 which is configurable in a first configuration and in a second configuration, different from the first configuration. A change from one configuration to the other can be effected by applying a force on the central part 410, see e.g. FIG. 1c, wherein the direction of the force implies a possible change from the second configuration as depicted back to the first configuration.

The fixation element 400 comprises at least two protruding elements 420 configured extending from the central part 410 in both configurations of the central part 410, see also FIG. 1b. The terminal parts 421 of the respective protruding elements 420 have a first mutual distance in the first configuration of the central part 410 and a second mutual distance in the second configuration of the central part 410 see also FIGS. 2c and 2d, wherein the first mutual distance is larger than the second mutual distance. The protruding elements may e.g. be punched away from the metal body. This leaves openings 414, which are also schematically depicted.

As shown in FIG. 1a, the fixation element 400 is configured to receive the light source support 300 in the first configuration and as shown in FIG. 2b, the fixation element is configured to fixate the light source support 300 to the metal-based support 100 in the second configuration.

The fixation element 400 may be obtainable by one or more of punching, stretching and pressing one or more parts of the metal body 140.

FIGS. 1a-1c schematically depict an embodiment the central part 410 has a circular shape. The central part comprises a central element 411 associated to the metal body 140 with at least two radially configured connector elements 412, and comprising radially configured openings 413 between the connector elements 412. Especially, the protruding elements 420 are punched parts of the connector elements 412.

Thus, as depicted in FIGS. 1 and 2, when the central part is in the first configuration the light source support may be pressed in the fixation element by applying a force in a first direction, so that the central part snaps or jumps into the second configuration, and wherein when the central part is in the second configuration the light source support may be released from the fixation element by applying a force in a second direction, wherein first direction and the second direction are perpendicular to the plane P, the second direction being opposite to the first direction.

FIGS. 2a-2b schematically depict an embodiment wherein the central part 410 has a rectangular shape, wherein the central part comprises a central element 411 associated to the metal body 140 with at least two bridgingly configured connector elements 412, bridging the distance between the central element 411 and the remainder of the metal body 140. Especially, the protruding elements 420 are punched parts of the connector elements 412.

As schematically depicted in FIGS. 1a-1c and 2a-2b, the first configuration FIG. 1a and FIG. 2a is convex configuration, relative to the protruding elements 420, and relative to a plane P, and the second configuration is concave see FIG. 1c and FIG. 2b, relative to protruding elements 420 and the plane P.

Referring to FIGS. 2c-2d, the terminal parts 421 of the respective protruding elements 420 have a first mutual distance d1 in the first configuration of the central part 410 and a second mutual distance d2 in the second configuration of the central part 410. The first mutual distance d1 is larger than the second mutual distance d2. In this way, the protruding elements 420 can snap an element, such as the guest support herein especially the light source support.

In embodiments, the metal body 140 may have a first thickness H1. The connector elements 412 have a second thickness H2. Especially, H2<H1 may apply. In embodiments the first thickness H1 is selected from the range of 0.3-2 mm, and the second thickness H2 is selected from the range of 0.1-1.5 mm.

FIG. 2e schematically depicts essentially the same embodiment as schematically depicted in FIG. 2e, but with some additional features, such as a housing and a light exit window, through which light source light 11 of the light source 10 may escape from the housing. Further, a specific variant is schematically depicted wherein the protruding elements 420 comprise electrodes 423 functionally coupled to electrically conductive elements 424, wherein the electrodes 423 are configured to functionally couple to second electrically conductive element 23 comprised by the lighting element 200 and functionally coupled to the light source 10.

FIG. 3a-3b schematically depict an embodiment of the metal-based support 100, further comprising (an embodiment) of a locking system 500, configured to maintain in a locked configuration the central part 410 in the second configuration and to allow in an unlocked configuration a change of the central part 410 from the second configuration to the first configuration. Also shown in this embodiment, at least part of the locking system 500 may be part of the metal body 140.

Here, in these schematically depicted embodiment the metal body 140 may further comprises a second element 600. The locking system 500 comprises this second element 600. The second element 600 is movable in a plane P of the metal body 140 in a direction away from the fixation element 400 when applying a force to the second element 600 (in a direction away from the fixation element 400).

The locking system 500 is in embodiments configured to maintain the central part 410 in the second configuration in a locked configuration when no force is applied to the second element 600 and to allow a change to the first configuration in an unlocked configuration when the force is applied to the second element 600. The fixation element 400 further comprises a locking element 613, which may have the function of a kind of barb, extending from the central part 410. Especially, the locking element 613 is configured such that when the fixation element 400 changes from the first configuration to the second configuration, the locking element 613 moves along part of the metal body 140 with friction, and in the second configuration the locking element 613 prevents return in the first configuration. When the second element 600 is moved in a plane P of the metal body 140 in a direction away from the fixation element 400 when applying a force to the second element 600, the locking element 613 can pass along the part of the metal. Hence, by applying forces such as indicated in FIGS. 3a and 3c, the fixation element 400 can be unlocked, such that the change from the second configuration to the first configuration may be obtained. References 417 refer to mechanical hinges. As locally the metal body may have some flexibility, the pushing or pulling the second element 600 in a direction away from the fixation element 400, the locking element 613 can now move along the metal body and the first configuration may be adopted when applying pressure on the central part such that the fixation element can change from the second configuration into the first configuration).

Especially, two or more locking system may be applied to the fixation element 400.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" includes also embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A support for a lighting element, wherein the lighting element comprises a light source support and a light source functionally coupled to the light source support, wherein the support comprises a body and a fixation element for fixating the light source support to the support, wherein the body has a plane (P), wherein at least part of the fixation element is part of the plane (P) of the body, wherein the fixation element comprises a central part which is configurable in a first configuration and in a second configuration, different from the first configuration, wherein a change from one configuration to the other can be effected by applying a force on the central part, wherein the fixation element comprises two protruding elements configured extending from the central part in both configurations of the central part, wherein terminal parts of the respective protruding elements have a first mutual distance in the first configuration of the central part and a second mutual distance in the second configuration of the central part, wherein the first mutual distance is larger than the second mutual distance, and wherein the fixation element is configured to receive the light source support in the first configuration and to fixate the light source support to the support by the protruding elements in the second configuration, and wherein when the central part is in the first configuration the light source support can be pressed in the fixation element by applying a force (F) in a first direction, so that the central part snaps or jumps into the second configuration, and wherein when the central part is in the second configuration the light source support can be released from the fixation element by applying a force (F) in a second direction, wherein first direction and the second direction are perpendicular to the plane (P), the second direction being opposite to the first direction.

2. The support according to claim 1, wherein the fixation element is obtainable by one or more of punching, stretching and pressing one or more parts of the body.

3. The support according to claim 1, wherein the first configuration is convex configuration, relative to the protruding elements, and wherein the second configuration is concave, relative to protruding elements.

4. The support according to claim 1, wherein the central part has a circular shape, wherein the central part comprises a central element associated to the body with at least two radially configured connector elements, and comprising radially configured openings between the connector elements, wherein the protruding elements are punched parts of the connector elements.

5. The support (100) according to claim 1, wherein the central part has a rectangular shape, wherein the central part comprises a central element associated to the body with at least two bridgingly configured connector elements, bridging the distance between the central element and the body, wherein the protruding elements are punched parts of the connector elements.

6. The support according to claim 1, wherein the body has a first thickness, wherein the connector elements have a second thickness, wherein H2<H1.

7. The support according to claim 6, wherein the first thickness is selected from the range of 0.3-2 mm, and wherein the second thickness is selected from the range of 0.1-1.5 mm.

8. The support according to claim 1, further comprising a locking system, configured to maintain in a locked configuration the central part in the second configuration and to allow in an unlocked configuration a change of the central part from the second configuration to the first configuration.

9. The support according to claim 8, wherein at least part of the locking system is part of the body.

10. The support according to claim 8, wherein the body further comprises a second element, wherein the locking system comprises the second element, wherein the second element is movable in a plane (P) of the body in a direction away from the fixation element when applying a force to the second element, wherein the locking system is configured to maintain the central part in the second configuration in a locked configuration when no force is applied to the second element and to allow a change to the first configuration in an unlocked configuration when the force is applied to the second element, wherein the fixation element further comprises a locking element, extending from the central part, wherein the locking element is configured such that when the fixation element changes from the first configuration to the second configuration, the locking element moves along part of the body with friction, and in the second configuration the locking element prevents return in the first configuration, wherein when the second element is moved in a plane (P) of the body in a direction away from the fixation element when applying a force to the second element, the locking element can pass along the part of the body and allow the fixation element return in the first configuration.

11. The support according to claim 1, wherein the protruding elements comprise electrodes functionally coupled to electrically conductive elements, wherein the electrodes are configured to functionally couple to second electrically conductive element comprised by the lighting element and functionally coupled to the light source.

12. A lighting device comprising the support according to claim 1.

13. A kit of parts comprising (i) the support according to claim 1 and (ii) a lighting element, wherein the lighting element comprises a light source support and a light source functionally coupled to the light source support.

14. The kit of parts according to claim 13, wherein the lighting element comprises the light source support and a plurality of solid state light sources functionally coupled to the light source support.

15. The kit of parts according to claim 13, wherein the light source support comprises a printed circuit board (PCB).

* * * * *